United States Patent
Weissmann et al.

(10) Patent No.: US 9,348,401 B2
(45) Date of Patent: May 24, 2016

(54) MAPPING A PERFORMANCE REQUEST TO AN OPERATING FREQUENCY IN A PROCESSOR

(71) Applicant: Intel Corporation, Santa Clara, CA (US)

(72) Inventors: Eliezer Weissmann, Haifa (IL); Efraim Rotem, Haifa (IL); Paul Diefenbaugh, Portland, OR (US); Guy Therien, Beaverton, OR (US); Nir Rosenzweig, Givat Ella (IL)

(73) Assignee: Intel Corporation, Santa Clara, CA (US)

( * ) Notice: Subject to any disclaimer, the term of this patent is extended or adjusted under 35 U.S.C. 154(b) by 333 days.

(21) Appl. No.: 13/926,025

(22) Filed: Jun. 25, 2013

(65) Prior Publication Data

US 2014/0380076 A1    Dec. 25, 2014

(51) Int. Cl.
*G06F 1/32*    (2006.01)

(52) U.S. Cl.
CPC .............. *G06F 1/324* (2013.01); *G06F 1/3243* (2013.01); *G06F 1/3293* (2013.01)

(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | |
|---|---|---|
| 5,163,153 A | 11/1992 | Cole et al. |
| 5,522,087 A | 5/1996 | Hsiang |
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |

(Continued)

FOREIGN PATENT DOCUMENTS

| | | |
|---|---|---|
| EP | 1 282 030 A1 | 5/2003 |
| WO | 2012170213 A2 | 12/2012 |

OTHER PUBLICATIONS

European Patent Office, Office Action Mailed Oct. 23, 2014, In European Application No. 14173718.9.

(Continued)

*Primary Examiner* — Zahid Choudhury
(74) *Attorney, Agent, or Firm* — Trop, Pruner & Hu, P.C.

(57) ABSTRACT

In an embodiment, a processor includes multiple cores each to independently execute instructions and a power control unit (PCU) coupled to the plurality of cores to control power consumption of the processor. The PCU may include a mapping logic to receive a performance scale value from an operating system (OS) and to calculate a dynamic performance-frequency mapping based at least in part on the performance scale value. Other embodiments are described and claimed.

18 Claims, 8 Drawing Sheets

(56) References Cited

U.S. PATENT DOCUMENTS

| | | |
|---|---|---|
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2009/0235108 A1* | 9/2009 | Gold et al. ............ 713/500 |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0154090 A1 | 6/2011 | Dixon et al. |
| 2011/0238974 A1* | 9/2011 | Wells et al. ............ 713/100 |
| 2012/0071216 A1 | 3/2012 | Salsbery et al. |
| 2012/0079290 A1 | 3/2012 | Kumar et al. |
| 2012/0246506 A1 | 9/2012 | Knight |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0151879 A1 | 6/2013 | Thomson et al. |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scaling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

U.S. Appl. No. 13/600,568, filed Aug. 31, 2012, entitled "Configuring Power Management Functionality in a Processor," by Malini K. Bhandaru, et al.

* cited by examiner

MAPPING A PERFORMANCE REQUEST TO AN OPERATING FREQUENCY IN A PROCESSOR

TECHNICAL FIELD

Embodiments relate to frequency control of a system, and more particularly to operating frequency control of a processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

Current operating system (OS) power management techniques implement dynamic control of processor power consumption indirectly by setting processor frequency. According to an OS power management protocol known as Advanced Configuration and Platform Interface (ACPI), performance or P-states are used by the OS to explicitly specify expected performance. Such performance values are semantic-less in that a higher performance value requested by the OS (e.g., 2× higher) will yield higher execution speed but the workload will not necessarily complete in half the time.

DETAILED DESCRIPTION

In various embodiments, a processor implements a technique to enable performance state requests received from an operating system (OS) or other system software to be dynamically mapped to a corresponding processor operating frequency based on a combination of a static mapping of performance to frequency and various dynamic information. Although the scope of the present invention is not limited in this regard, in an embodiment this dynamic information may include a dynamic workload scalability metric that may cause a given performance state request to map to different operating frequencies in different circumstances, depending on the value of this scalability metric. Other parameters may also be considered and can cause further differences in mapping a performance state request to a selected operating frequency based on such parameters.

Figure 1:
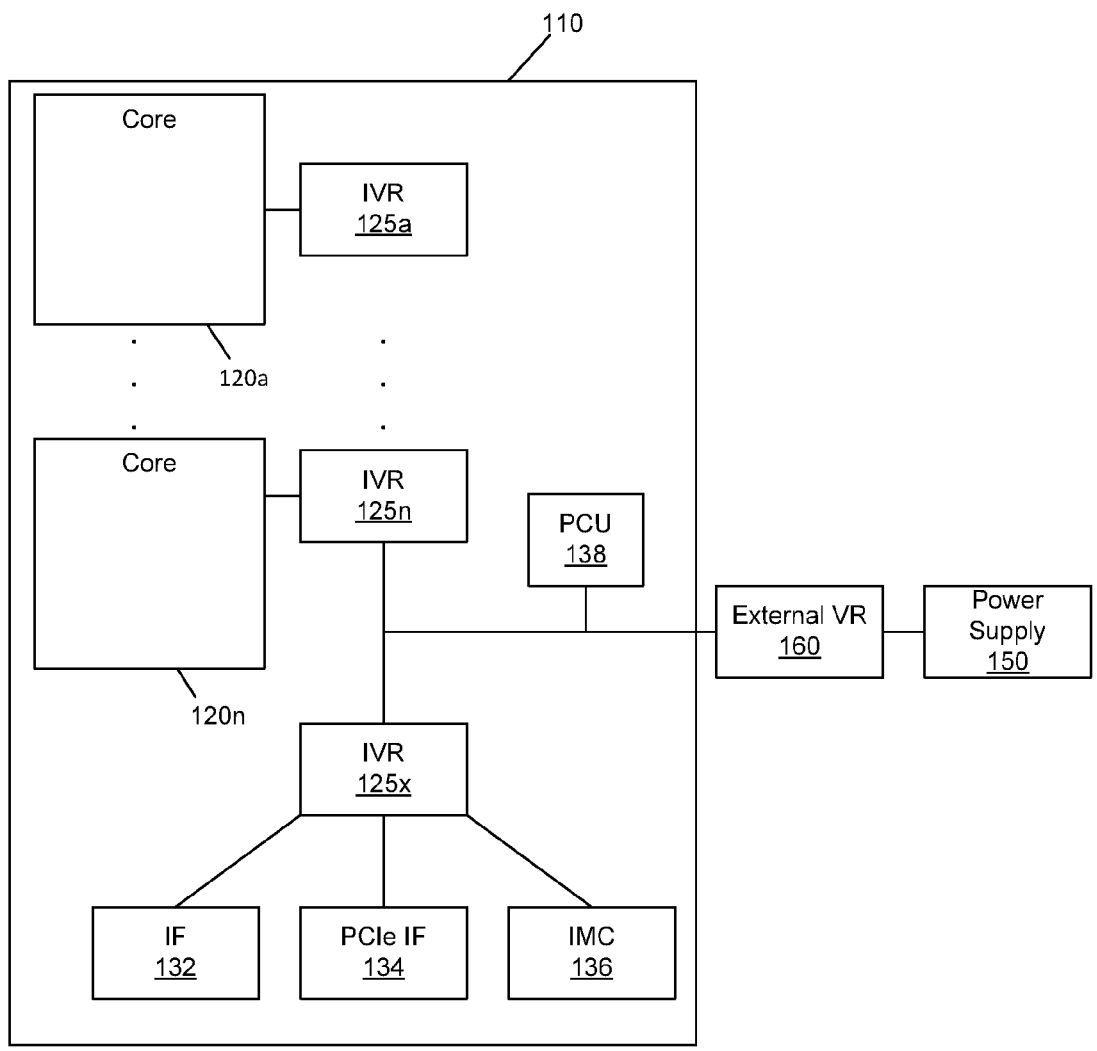
FIG. 1 is a block diagram of a system in accordance with one embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores 120a-120n. In addition, each core may be associated with an individual voltage regulator 125a-125n. Accordingly, an internal integrated voltage regulator implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another integrated voltage regulator 125x. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. In various embodiments, PCU 138 may include logic to provide static mapping values that map performance to operating frequency to an OS, namely the performance scale values discussed further below. Furthermore, this logic may further receive an incoming performance scale value from the OS and dynamically map it to a target operating frequency as described herein, as well as to provide a delivered performance scale value back to the OS. Namely, this delivered performance scale value may be based on a dynamic mapping determined in the PCU.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the hardware performance-based operating frequency control described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In some embodiments, the P1 level can also be controlled by software by changes to a power budget or other metrics. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth). As described herein, an OS-requested performance level may be mapped to a target operating frequency, and in turn a feedback value corresponding to a delivered performance level at which the processor is operating may be communicated back to the OS.

In various embodiments, dynamic data that an OS provides to a processor may be used to dynamically determine processor operating frequency. Examples of such OS-provided information include: desired performance level, tolerance and performance limits, among others described below. In many implementations, the OS communicates all these parameters atomically such that these values are coherent at any given time.

The processor assumes a 1:1 relation between performance ratio and frequency ratio along a curve of performance to frequency. Of course understand that in other embodiments, another linear metric between performance and frequency may be present. This curve is a benchmark or baseline curve having a 1:1 relation between performance and frequency. In an embodiment, this curve may be fused into a processor, e.g., based on manufacturing testing or other predetermined criteria and thus is a static mapping of performance to frequency. For example, information may be stored in a table present in a non-volatile storage of the processor such as a set of fuses or other non-volatile storage, in an embodiment. In general, a plurality of entries may be stored in this table, each of which associates a performance scale value (also referred to herein as a hardware performance scale value) to a corresponding processor operating frequency. Note that the number of entries in the table may vary in different implementations. For ease of discussion and illustration, an example table including 4 entries is described herein. Each of these entries includes a hardware performance scale value and a corresponding operating frequency value, among other possible information such as a most efficient performance level. In general, each of these 4 performance scale values may correspond to a given performance enumeration point. These performance enumeration points and their corresponding performance scale values may be converted to the OS, e.g., on startup. Note that these performance scale values are different than and do not directly map to ACPI P-states: instead they are of a hardware-based independent performance scale.

Referring now to Table 1, shown is an example set of performance scale values and corresponding frequency values. In addition, the table associates each of these entries with a corresponding hardware performance enumeration point and an associated frequency point.

TABLE 1

| HWP Performance Enumeration Points | HWP Performance Scale | Associated Frequency Points | Frequency Values |
|---|---|---|---|
| Lower linear | 1 | Max modulation frequency | 100 MHz |
| Lower non linear | 8 | Minimal frequency | 800 MHz |
| Nominal | 24 | Nominal frequency | 2400 MHz |
| Highest | 32 | Max turbo frequency | 3200 MHz |

In an embodiment, a processor communicates the performance enumeration points and their scale to the OS during OS startup. In the example of Table 1, OS requests for a given performance state are issued to the processor within the range of Lower Linear and Highest; otherwise they are rounded up or down.

The OS provides other parameters in addition to the requested performance for the processor to use when setting frequency. In an embodiment, these parameters include: tolerance which is a measure of how much performance loss the OS is willing to tolerate as a result of processor sub-optimal setting of the frequency; power/performance bias which is a hint on OS preference (and in an embodiment may indicate a performance preference in which the whole tolerance is not used to save power, a power preference in which as much power as possible is saved within the tolerance, and a balanced preference, which is a balance between the preferences); a lowest performance limit which is a value the processor should not provide lower performance than for quality or service reasons; and a highest performance which is a value that the processor should not provide higher performance than that for thermal limit/cooling capability reasons.

During the steady state, when the OS requests a specific desired performance with an associated tolerance and low/high limits, the processor first maps the desired performance value to a baseline frequency along the 1:1 curve. The processor may then compute an updated or realistic frequency/performance curve around the baseline frequency obtained from the baseline curve, taking into account dynamic workload scalability. In an embodiment, this curve may be computed according to the following equation:

$$PerdiectedPerformance = \frac{Desired}{Scl * \frac{Frequency_{DesiredLinearMap}}{Frequency_{Current}} + (1 - Scl)}$$

where: Desired is the OS desired performance request; $Frequency_{DesiredLinearMap}$ is the baseline frequency for the desired performance request (Desired); $Frequency_{Current}$ is the variable frequency along the X-axis of the realistic curve; Predicted Performance is the Y-axis performance value as a function of the $Frequency_{Current}$ value; and Sc1 is a workload scalability value, which may be dynamically determined for a given workload based on a set of processor metrics. In an embodiment, the scalability is a prediction of the scalability of performance in a function of frequency change. The prediction is done by collecting a set of micro-architectural performance counters for a workload and conducting the scalability value based thereon. In an embodiment, the higher the correlation between frequency and performance, the higher the scalability value, with a maximum scalability value being 1.

Once the realistic curve is computed for a given OS request and a given scalability value, the realistic curve generated may be used for determining an appropriate operating frequency and reporting a corresponding performance level back to the OS. The OS may use this updated or realistic performance level in a feedback mechanism for generating a next OS performance request.

In general, based on various OS-provided values as well as processor metrics and constraints on operation, the processor can determine an appropriate target operating frequency for the processor. For example, performance scale value and energy performance bias from the OS, and in some embodiments, processor hardware-based values including a dynamic mapping (updated curve in FIG. 2) and dynamic scalability factor. Once this target operating frequency is determined, it is compared to the OS-requested performance limits to ensure that the target operating frequency is within the limits; if not, the target operating frequency can be updated accordingly. Next, the processor can be controlled to operate at this target operating frequency. In addition, using this target operating frequency and the dynamic updated or realistic curve, a corresponding predicted performance level can be determined and provided back to the processor as a delivered performance level that enables the OS to update its performance request algorithm using this delivered performance level.

In an embodiment, the tolerance value provided by the OS may be communicated in terms of a performance scale value. In such embodiment, the processor maps this value to the lowest frequency to set based on the realistic curve. As part of operating frequency optimization, this lowest frequency is used as the lower limit on frequency selection.

Note that in different embodiments, a variety of different values can be used in determining a target operating frequency. In an embodiment, these values may include the energy performance bias value, energy efficiency, race to halt and other considerations.

The processor then maps the OS dynamic minimum/maximum performance limit values to frequency (using the updated curve), and adjusts the target operating frequency (e.g., rounds up or down) if the target operating frequency is an out of bounds frequency. The processor operating frequency is then set as this resulting target operating frequency.

When the OS requests feedback of the actual or delivered performance value, the processor maps the operating frequency at which it is executing to obtain the delivered performance using the realistic curve.

Figure 2:
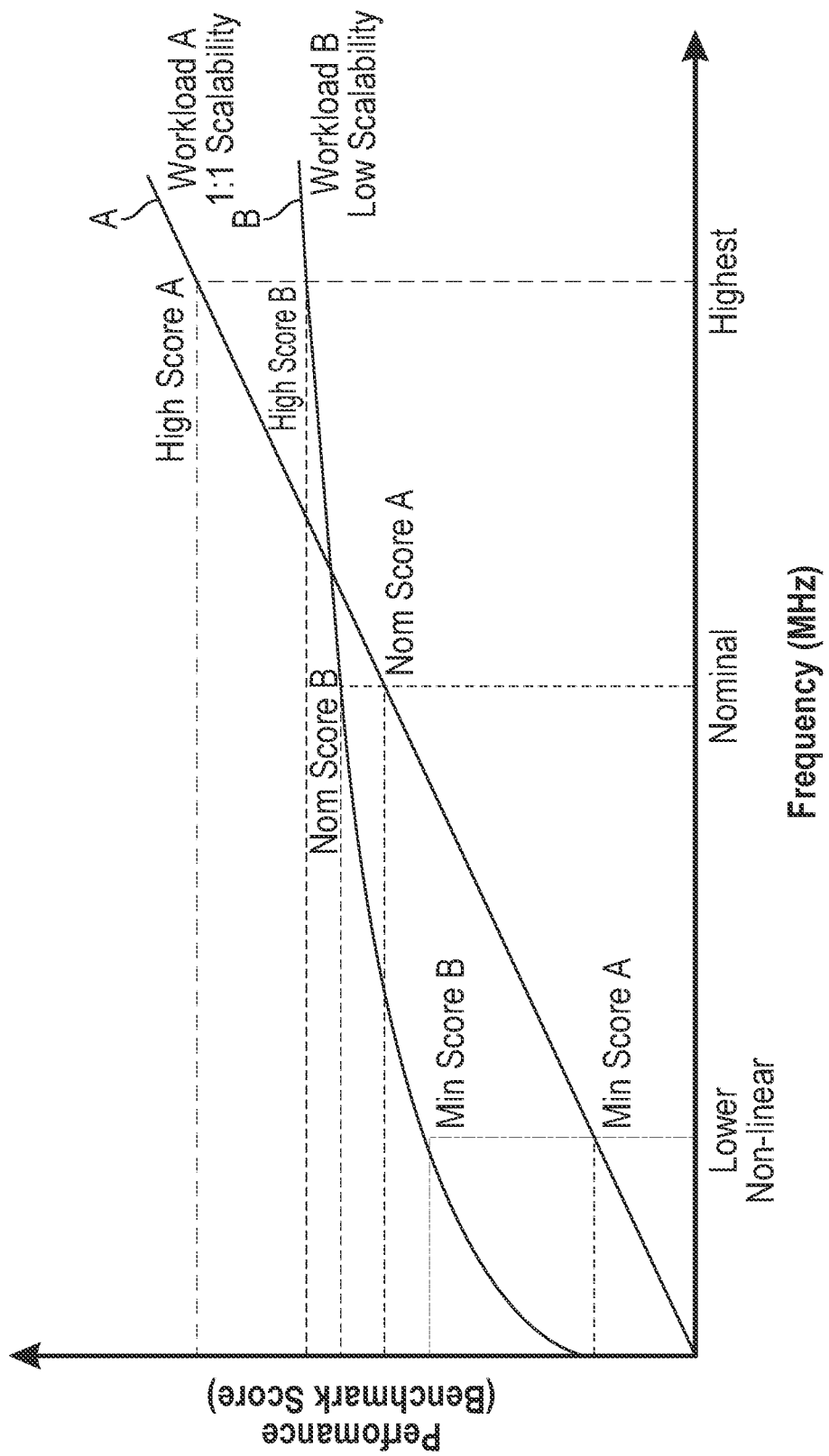
FIG. 2 is a graphical illustration of performance versus frequency in accordance with an embodiment of the present invention.

Referring now to FIG. 2, shown is a graphical illustration of performance versus frequency in accordance with an embodiment of the present invention. As shown in FIG. 2, a first curve is a static baseline or benchmark curve A having a 1:1 scalability metric. As seen, this curve is a straight line that is generated using the provided performance scale values and corresponding frequency values obtained from a processor non-volatile storage. In the embodiment shown, each of these 4 entries thus corresponds to a point on the line in which the corresponding performance scale value maps to the given operating frequency.

Also seen in FIG. 2 is a second curve B, which corresponds to a dynamic updated or realistic curve that is generated by the processor based on a given scalability metric and a desired performance scale value corresponding to an OS-requested performance scale value. Thus as seen, curve B has a crossing point on curve A that corresponds to the OS-requested performance scale value. During operation, a processor determines an appropriate operating frequency based on this curve B as a function of the tolerance, EPB setting and minimum and maximum values such that the determined target operating frequency will be on curve B.

Furthermore, for purposes of providing feedback information to the OS, the point on curve B corresponding to the target operating frequency is reported to the OS as the delivered performance scale value. Although shown with this particular updated curve in FIG. 2, understand that different shapes of this curve may occur depending on a desired performance scale value and scalability value. In various embodiments, the rate at which this dynamic curve is determined may vary. In some embodiments this update may occur responsive to a change in a performance scale value request from the OS, upon a change to the scalability value, e.g., as received from scalability logic of the processor, or at a predetermined time interval.

Figure 3:
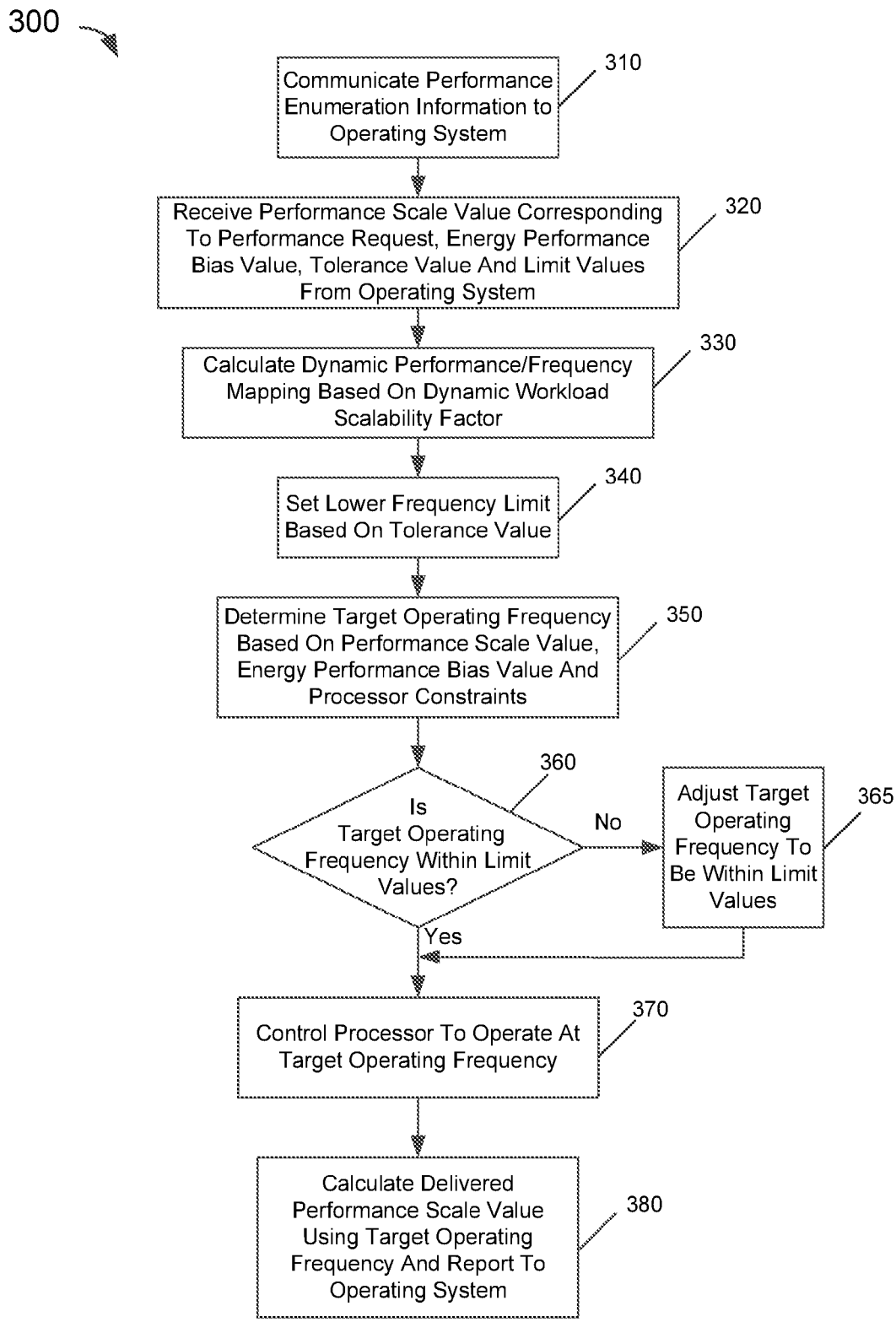
FIG. 3 is a flow diagram of a method for controlling a processor operating frequency in accordance with an embodiment of the present invention.

Referring now to FIG. 3, shown is a flow diagram of a method for controlling a processor operating frequency responsive to an OS performance request in accordance with an embodiment of the present invention. As shown in FIG. 3, method 300 may be performed by various hardware of a processor such as a power control unit or other logic configured to receive various information and responsive to the information determine an appropriate operating frequency for the processor.

As seen in FIG. 3, method 300 begins by communicating performance enumeration information to the OS (block 310). In an embodiment, such information may be communicated on power up of a system. This information may be obtained, e.g., from a non-volatile storage of the processor and may include a fixed mapping of a plurality of performance scale values to corresponding operating frequencies.

Next, control passes to block 320 where during normal operation of the system a performance scale value request is received from the OS. In addition, in various embodiments other information may be received from the OS, including an energy performance bias value, a tolerance value, and limit values such as low and high limits on the performance scale value. Then at block 330 a dynamic performance/frequency mapping may be calculated. More specifically this curve may be calculated based on a dynamic workload scalability factor. As discussed above, the scalability factor may be a measure of the correlation between frequency and performance. Based on the tolerance value, which in an embodiment may be in terms of a performance scale value, a lower frequency limit may be set (block 340). Note that a minimum value that maps to a frequency direction may also be used as a floor for this operation.

With reference still to FIG. 3, control passes to block 350 where a target operating frequency may be determined. In an embodiment, various parameters may be considered in determining a target operating frequency which may be based at least in part on performance scale value received from the OS. In addition, other parameters to be considered include, for example, an energy performance bias value, which indicates a user's desire for a balance between power consumption and performance, as well as processor constraints such as thermal constraints, voltage constraints and so forth. Control next passes to diamond 360 where it may be determined whether the target operating frequency is within the limit values. If not, control passes to block 365 where the target operating frequency may be adjusted to be within such limit values. For example, the determined target operating frequency may be rounded up or down to be within the limits.

Then the processor may be controlled to operate at the target operating frequency (block 370). For example, the PCU may send appropriate clock control signals to clock controller circuitry of the processor to cause various clocks to be adjusted to enable operation at the target operating frequency.

Note that while a single target operating frequency is discussed, understand the scope of the present invention is not limited in this regard. For example, method 300 may be independently performed for various independent domains of a processor to determine an appropriate target operating frequency for each domain. Or in other embodiments, certain domains may be controlled in this manner while other domains may be controlled according to another technique or may be fixed at a predetermined frequency. For example, method 300 may be used to control a core domain such that a given core or a plurality of cores is controlled to operate at the determined target operating frequency. Instead other domains such as a system agent domain may operate at a potentially different frequency.

Finally, control passes to block 380 where a delivered performance scale value may be calculated. More specifically, this delivered performance scale value may be determined based on a target operating frequency using the dynamic performance/frequency mapping such that for a given target operating frequency, the corresponding performance scale value is the delivered performance scale value. Accordingly, this value may be communicated to the OS.

Note that the OS may use this value in a feedback mechanism to thus perform self-learning such that a subsequent performance state request from the OS may use this information to request a more appropriate performance state via a given performance scale value. Although shown at this high level in the embodiment of FIG. 3, understand the scope of the present invention is not limited in this regard.

Figure 4:
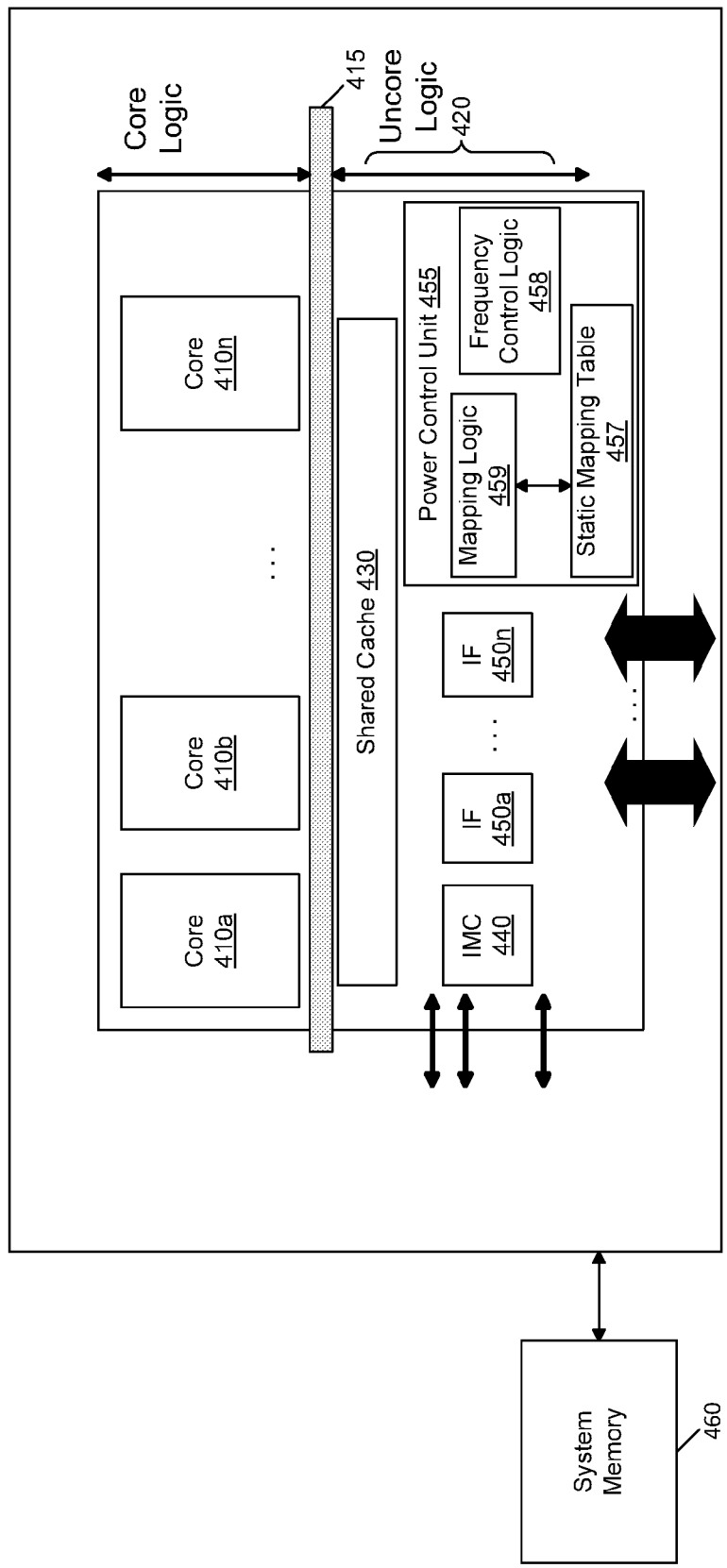
FIG. 4 is a block diagram of a processor in accordance with an embodiment of the present invention.

Embodiments can be implemented in processors for various markets including server processors, desktop processors, mobile processors and so forth. Referring now to FIG. 4, shown is a block diagram of a processor in accordance with an embodiment of the present invention. As shown in FIG. 4, processor 400 may be a multicore processor including a plurality of cores 410a-410n. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455. In various embodiments, power control unit 455 may include a mapping logic 459 that operates to perform the dynamic performance-frequency mapping described herein. Furthermore, based on a given OS performance request, this dynamic mapping may be generated and further can be used to dynamically determine a target operating frequency, e.g., in frequency control logic 458. As further seen in FIG. 5, power control unit 455 further includes a static mapping table 457, which may be stored in a non-volatile memory and which includes entries each to associate a performance scale value with a corresponding operating frequency, e.g., according to a 1:1 mapping. As discussed above, information from these entries can be communicated to an OS. Understand that these logics and table may be differently implemented or located elsewhere in other embodiments.

With further reference to FIG. 4, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 4, the scope of the present invention is not limited in this regard.

Figure 5:
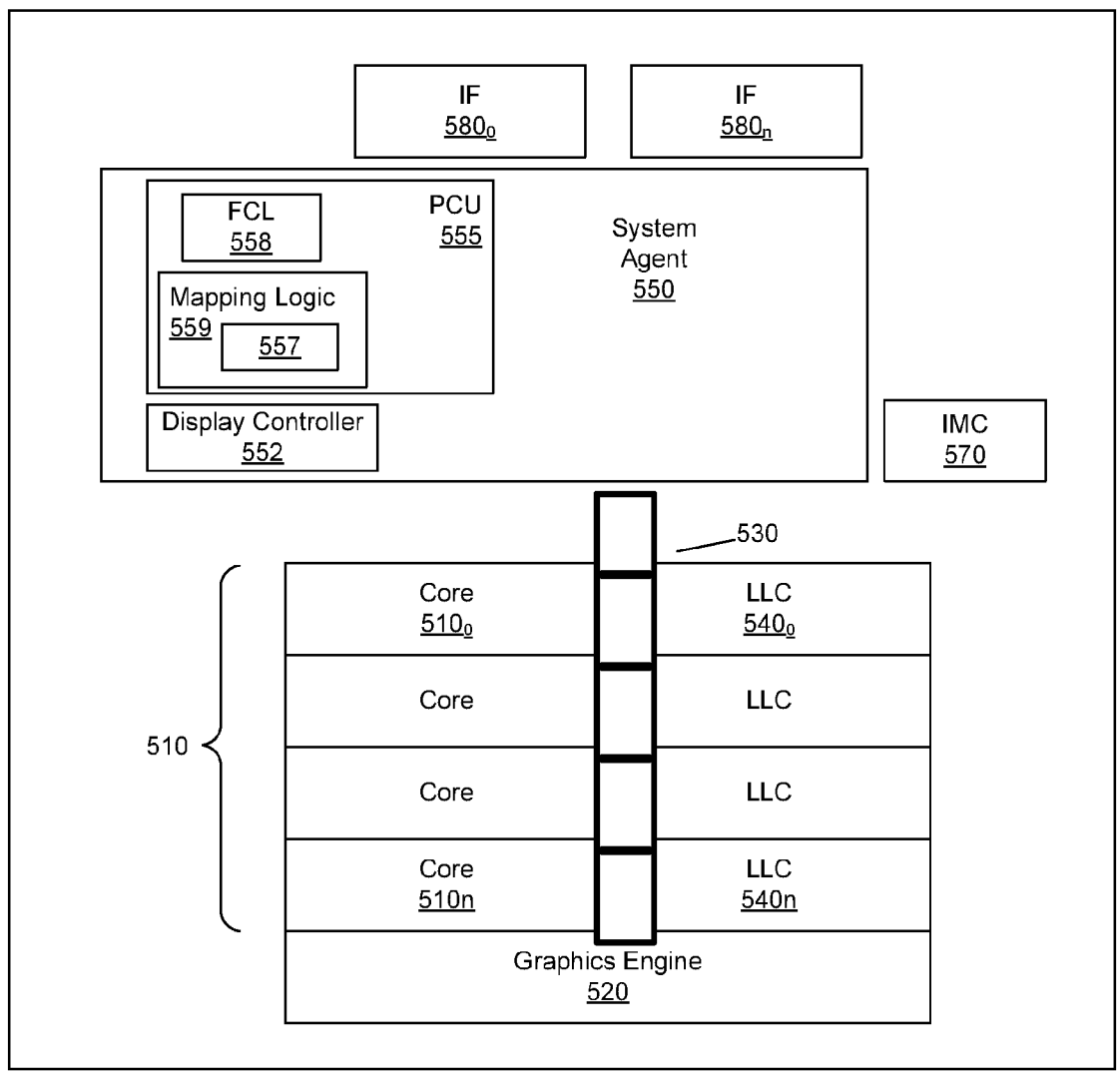
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include a mapping logic 559 (and which may include an internal static mapping table 557) in accordance with an embodiment of the present invention to dynamically generate a performance-frequency mapping, and a frequency control logic 558 to enable selection of an appropriate target operating frequency at which one or more cores 510 may operate. In addition, mapping logic 559 may communicate a delivered performance scale value back to the OS or other system software. In various embodiments, this logic may execute the algorithm described above in FIG. 3.

As further seen in FIG. 5, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 5, understand the scope of the present invention is not limited in this regard.

Figure 6:
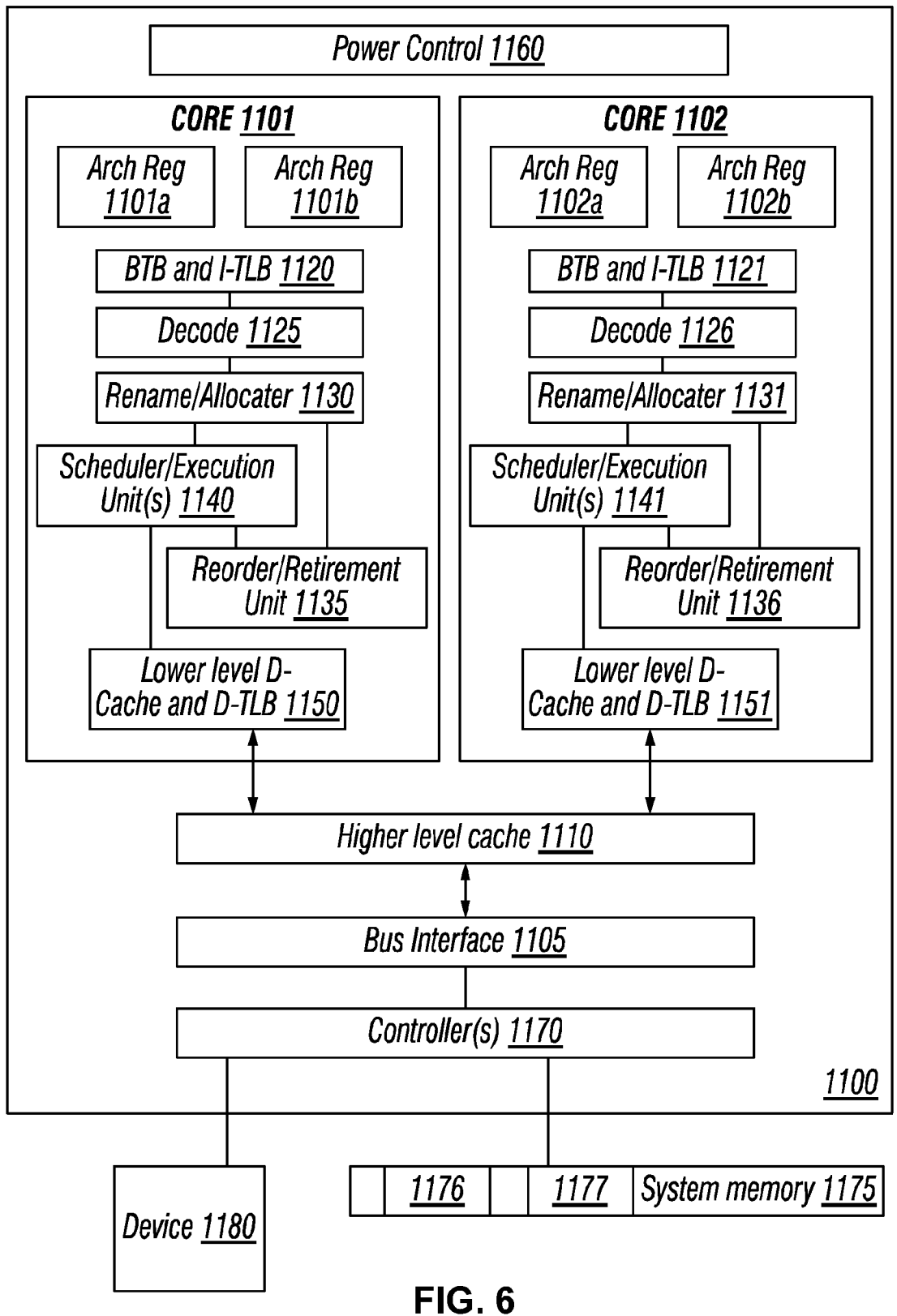
FIG. 6 is a block diagram of a processor including multiple cores in accordance with an embodiment of the present invention.

Referring to FIG. 6, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 6, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101*a* and 1101*b*, which may also be referred to as hardware thread slots 1101*a* and 1101*b*. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101*a*, a second thread is associated with architecture state registers 1101*b*, a third thread may be associated with architecture state registers 1102*a*, and a fourth thread may be associated with architecture state registers 1102*b*. Here, each of the architecture state registers (1101*a*, 1101*b*, 1102*a*, and 1102*b*) may be referred to as processing elements, thread slots, or thread units, as described above. As illustrated, architecture state registers 1101*a* are replicated in architecture state registers 1101*b*, so individual architecture states/contexts are capable of being stored for logical processor 1101*a* and logical processor 1101*b*. In core 1101, other smaller resources, such as instruction pointers and renaming logic in allocator and renamer block 1130 may also be replicated for threads 1101*a* and 1101*b*. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 7:
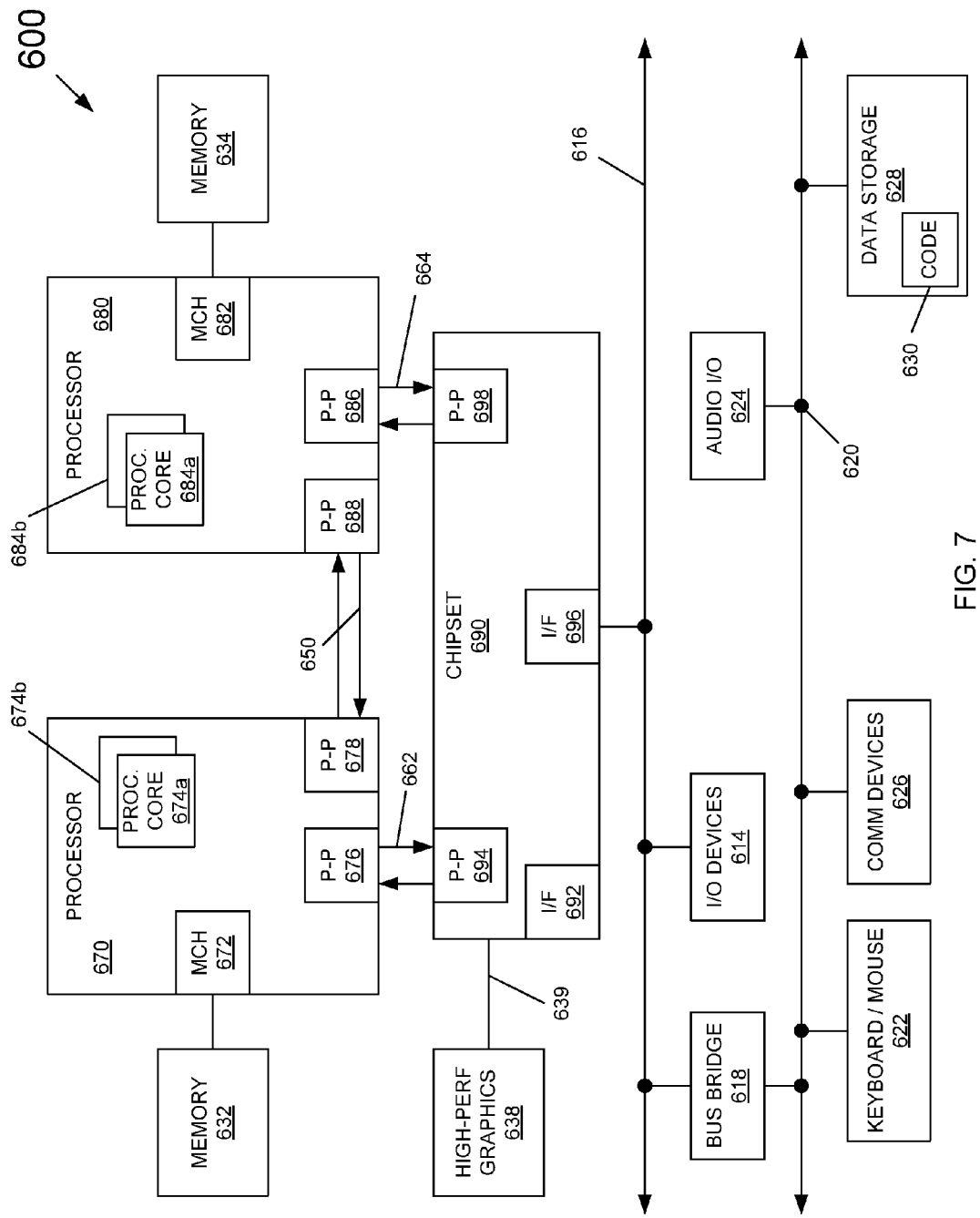
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674*a* and 674*b* and processor cores 684*a* and 684*b*), although potentially many more cores may be present in the processors. Each of the processors can include a PCU or other logic to perform dynamic performance-frequency mapping and to determine an appropriate operating frequency based at least in part on this mapping.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Embodiments provide a performance-based OS/processor control and feedback technique that is more natural for the OS than pure frequency-based OS control. Embodiments thus map performance to frequency dynamically based on workload, processor metrics, OS information and other values.

Figure 8:
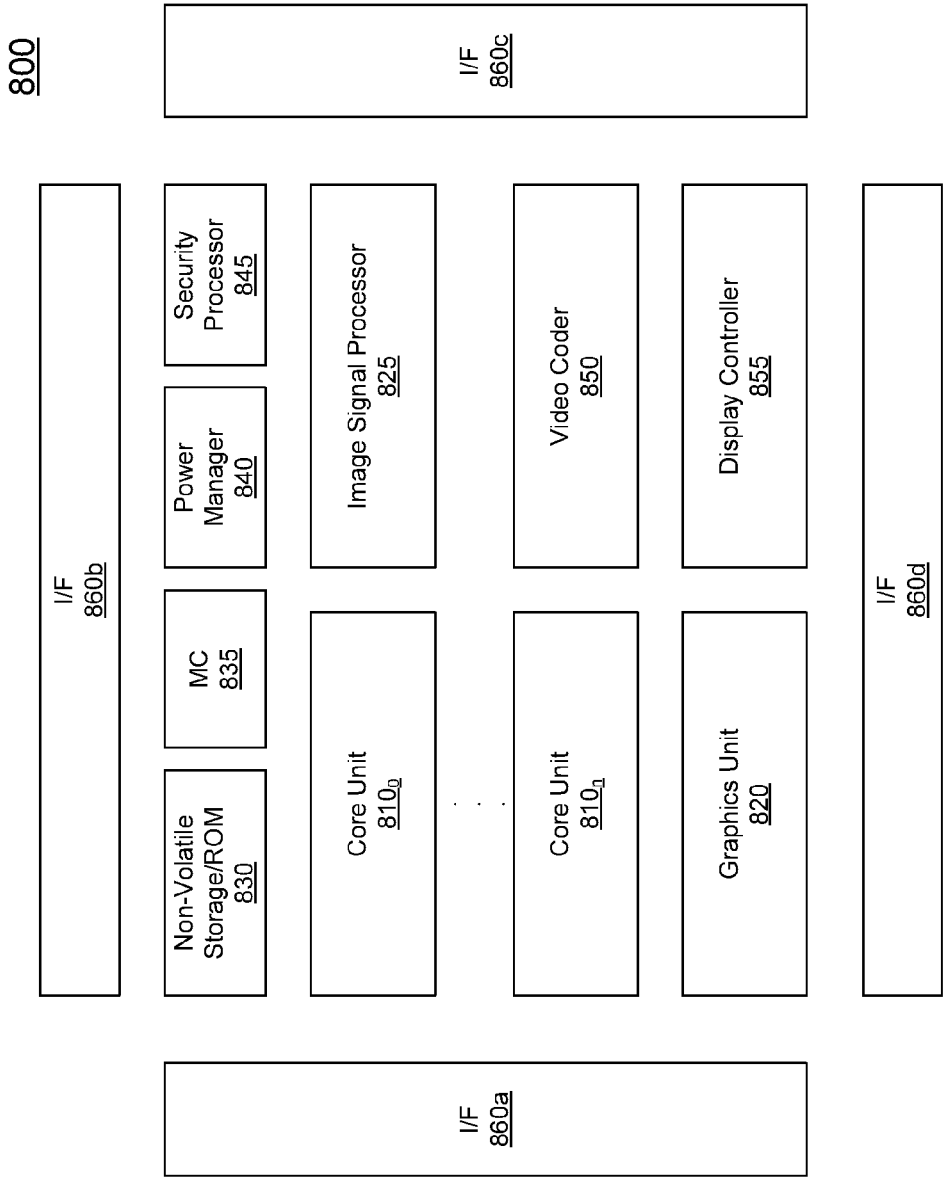
FIG. 8 is a block diagram of a processor in accordance with an embodiment of the present invention.

Embodiments can be implemented in processors for various markets including server processors, desktop processors, mobile processors and so forth. Referring now to FIG. 8, shown is a block diagram of a processor in accordance with an embodiment of the present invention. In the embodiment of FIG. 8, processor 800 may be a system on a chip (SoC) including multiple domains, each of which may be controlled to operate at an independent operating voltage and operating frequency. As a specific illustrative example, processor 800 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or Texas Instruments OMAP processor. Such SoC may be used in a low power system such as a smartphone, tablet computer, Ultrabook™ computer or other portable computing device.

In the high level view shown in FIG. 8, processor 800 includes a plurality of core units 810$_0$-810$_n$. Each core unit may include one or more processor cores. Each core unit 810 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.) or other instruction set or combinations thereof. Note that some of the core units may be heterogeneous resources (e.g., of a different design). In addition, each such core may be coupled to a cache memory which in an embodiment may be a shared level (L2) cache memory. A non-volatile storage 530 may be used to store various program and other data. For example, this storage may be used to store at least portions of microcode, boot information such as a BIOS, other system software or so forth.

Each core unit 810 may also include an interface such as a bus interface unit to enable interconnection to additional circuitry of the processor. In an embodiment, each core unit 810 couples to a coherent fabric that may act as a primary cache coherent on-die interconnect that in turn couples to a memory controller 835. In turn, memory controller 835 controls communications with a memory such as a dynamic random access memory (DRAM) (not shown for ease of illustration in FIG. 8). In addition, at least one image signal processor 825 may be present. Signal processor 825 may be configured to process incoming image data received from one or more capture devices, either internal to the SoC or off-chip.

In addition to core units, additional processing engines are present within the processor, including at least one graphics unit 820 which may include one or more graphics processing units (GPUs) to perform graphics processing as well as to possibly execute general purpose operations on the graphics processor (so-called GPGPU operation). In addition, other accelerators may be present. In the illustration of FIG. 8, a video coder 850 may perform coding operations for video information including encoding and decoding, e.g., providing hardware acceleration support for high definition video content. A display controller 855 further may be provided to accelerate display operations including providing support for internal and external displays of a system. In addition, a security processor 845 may be present to perform security operations such as secure boot operations, various cryptography operations and so forth.

Each of the units may have its power consumption controlled via a power manager 840. Power manager 840 includes control logic to determine appropriate operating voltage and frequency for each of the domains (and in some embodiments, sub-units of the domains), e.g., based on an available power budget and request for given performance and/or low power state.

In some embodiments, SoC 800 may further include a non-coherent fabric coupled to the coherent fabric to which various peripheral devices may couple. One or more interfaces 860a-860d enable communication with one or more off-chip devices. Such communications may be according to a variety of communication protocols such as PCIe™, GPIO, USB, I$^2$C, UART, MIPI, SDIO, DDR, SPI, HDMI, among other types of communication protocols. Although shown at this high level in the embodiment of FIG. 8, understand the scope of the present invention is not limited in this regard.

The following examples pertain to further embodiments.

In one example, a processor comprises a plurality of cores each to independently execute instructions, and a power control unit (PCU) coupled to the plurality of cores to control power consumption of the processor, the PCU including a mapping logic to receive a performance scale value from an operating system (OS) and to calculate a dynamic performance-frequency mapping based at least in part on the performance scale value.

In an example, the processor further comprises a frequency control logic to determine a target operating frequency based at least in part on the performance scale value and one or more processor constraints. In an example, the frequency control logic is to cause the processor to operate at the target operating frequency. In an example, the mapping logic is further to receive the target operating frequency and map the target operating frequency to a delivered performance scale value using the dynamic performance-frequency mapping. In an example, the mapping logic is to communicate the delivered performance scale value to the OS.

In an example, the processor further comprises a non-volatile storage to store a table having a plurality of entries each associating a performance scale value to an operating frequency, the table corresponding to a static performance-frequency mapping. In an example, the mapping logic is to communicate performance enumeration information to the OS. In an example, the performance enumeration information includes at least some of the plurality of entries of the table.

In an example, the mapping logic is to receive a tolerance value, an energy performance bias, a first limit value and a second limit value from the OS. In an example, the frequency control logic is to adjust the determined target operating frequency based at least on one of the tolerance value and the first and second limit values. In an example, the frequency control logic is to determine the target operating frequency further based on the energy performance bias.

Note that the above processor can be implemented using various means.

In an example, the processor comprises a system on a chip (SoC) incorporated in a user equipment touch-enabled device.

In another example, a system comprises a display and a memory, and includes the processor of one or more of the above examples.

In one example, a machine-readable medium having stored thereon instructions, which if performed by a machine cause the machine to perform a method comprising receiving a performance scale value corresponding to a performance request and an energy performance bias value in a first logic of a processor, calculating, in the first logic, a dynamic performance-frequency mapping based at least in part on a dynamic workload scalability factor and the performance scale value, and determining, in the first logic, a target operating frequency for at least a portion of the processor based on the performance scale value, the energy performance bias value and at least one processor constraint.

In an example, the method further comprises communicating performance enumeration information including a plurality of performance scale values to an operating system (OS), and thereafter receiving the performance scale value from the OS. In an example, the method further comprises receiving limit values in the first logic, determining if the target operating frequency is within the limit values, and if not, adjusting the target operating frequency to be within the limit values.

In an example, the method further comprises calculating a delivered performance scale value using the target operating frequency and the dynamic performance-frequency mapping, and reporting the delivered performance scale value to an operating system. In an example, the method further comprises determining the dynamic workload scalability factor based on a workload executing on the processor.

In one example, a system comprises a multicore processor including a plurality of cores and a power controller having a first logic to receive a performance scale value indicative of an operating system (OS)-requested performance level, the performance scale value one of a plurality of performance scale values communicated to the OS by the first logic, and to generate a dynamic performance-frequency mapping using the performance scale value, a scalability value and a static performance-frequency mapping, where the first logic is to communicate a delivered performance scale value to the OS.

In an example, the first logic is to determine a target operating frequency based at least in part on the performance scale value and one or more processor constraints. In an example, the first logic is to map the target operating frequency to the delivered performance scale value using the dynamic performance-frequency mapping. In an example, the first logic is to obtain the plurality of performance scale values from a non-volatile storage having a table to associate each of the plurality of performance scale values with an operating frequency, the table corresponding to the static performance-frequency mapping.

In one example, a processor comprises a plurality of cores each to independently execute instructions, and a power control unit (PCU) coupled to the plurality of cores to control power consumption of the processor, the PCU including a mapping means for receiving a performance scale value from an operating system (OS) and calculating a dynamic performance-frequency mapping based at least in part on the performance scale value.

In an example, the processor further comprises a frequency control means for determining a target operating frequency based at least in part on the performance scale value and one or more processor constraints. In an example, the frequency control means is to cause the processor to operate at the target operating frequency. In an example, the mapping means is further to receive the target operating frequency and map the target operating frequency to a delivered performance scale value using the dynamic performance-frequency mapping. In an example, the mapping means is to communicate the delivered performance scale value to the OS.

In an example, the processor further comprises a non-volatile storage to store a table having a plurality of entries each associating a performance scale value to an operating frequency, the table corresponding to a static performance-frequency mapping. In an example, the mapping means is to communicate performance enumeration information to the OS. In an example, the performance enumeration information includes at least some of the plurality of entries of the table. In an example, the mapping means is to receive a tolerance value, an energy performance bias, a first limit value and a second limit value from the OS.

In an example, the frequency control means is to adjust the determined target operating frequency based at least on one of the tolerance value and the first and second limit values. In an example, the frequency control means is to determine the target operating frequency further based on the energy performance bias.

In one example, a method comprises receiving a performance scale value corresponding to a performance request and an energy performance bias value in a first logic of a processor, calculating, in the first logic, a dynamic performance-frequency mapping based at least in part on a dynamic workload scalability factor and the performance scale value, and determining, in the first logic, a target operating frequency for at least a portion of the processor based on the performance scale value, the energy performance bias value and at least one processor constraint.

In an example, the method further comprises communicating performance enumeration information including a plurality of performance scale values to an operating system (OS), and thereafter receiving the performance scale value from the OS. In an example, the method further comprises receiving limit values in the first logic, determining if the target operating frequency is within the limit values, and if not, adjusting the target operating frequency to be within the limit values. In an example, the method further comprises calculating a delivered performance scale value using the target operating frequency and the dynamic performance-frequency mapping, and reporting the delivered performance scale value to an operating system. In an example, the method further comprises determining the dynamic workload scalability factor based on a workload executing on the processor.

In an example, an apparatus comprises means for performing the method of any one or more of the above examples.

In an example, at least one machine readable medium comprises a plurality of instructions that in response to being executed on a computing device, cause the computing device to carry out a method according to any one or more of the above examples.

In an example, a machine readable medium includes code, when executed, to cause a machine to perform the method of any one or more of the above examples.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of cores each to independently execute instructions; and
a power control unit (PCU) coupled to the plurality of cores to control power consumption of the processor, the PCU including a mapping logic to receive a performance scale value from an operating system (OS) and to dynamically calculate a dynamic performance-frequency mapping based at least in part on the performance scale value and a workload scalability value for a workload to be executed on the processor, and a frequency control logic to dynamically determine a target operating frequency based at least in part on the dynamic performance-frequency mapping, the performance scale value and one or more processor constraints.

2. The processor of claim 1, wherein the frequency control logic is to cause the processor to operate at the target operating frequency.

3. The processor of claim 1, wherein the mapping logic is further to receive the target operating frequency and map the target operating frequency to a delivered performance scale value using the dynamic performance-frequency mapping.

4. The processor of claim 3, wherein the mapping logic is to communicate the delivered performance scale value to the OS.

5. The processor of claim 1, further comprising a non-volatile storage to store a table having a plurality of entries each to associate a performance scale value to an operating frequency, the table corresponding to a static performance-frequency mapping.

6. The processor of claim 5, wherein the mapping logic is to communicate performance enumeration information to the OS.

7. The processor of claim 6, wherein the performance enumeration information includes at least some of the plurality of entries of the table.

8. The processor of claim 1, wherein the mapping logic is to receive a tolerance value, an energy performance bias, a first limit value and a second limit value from the OS.

9. The processor of claim 8, wherein the frequency control logic is to adjust the determined target operating frequency based at least on one of the tolerance value and the first and second limit values.

10. The processor of claim 8, wherein the frequency control logic is to determine the target operating frequency further based on the energy performance bias.

11. A non-transitory machine-readable medium having stored thereon instructions, which if performed by a machine cause the machine to perform a method comprising:
receiving a performance scale value corresponding to a performance request, limit values, and an energy performance bias value in a first logic of a processor;
calculating, in the first logic, a dynamic performance-frequency mapping based at least in part on a dynamic workload scalability factor and the performance scale value;
determining, in the first logic, a target operating frequency for at least a portion of the processor based on the performance scale value, the energy performance bias value and at least one processor constraint; and
determining if the target operating frequency is within the limit values, and if not, adjusting the target operating frequency to be within the limit values.

12. The non-transitory machine-readable medium of claim 11, wherein the method further comprises communicating performance enumeration information including a plurality of performance scale values to an operating system (OS), and thereafter receiving the performance scale value from the OS.

13. The non-transitory machine-readable medium of claim 11, wherein the method further comprises calculating a delivered performance scale value using the target operating frequency and the dynamic performance-frequency mapping, and reporting the delivered performance scale value to an operating system.

14. The non-transitory machine-readable medium of claim 11, wherein the method further comprises determining the dynamic workload scalability factor based on a workload executing on the processor.

15. A system comprising:
a multicore processor including a plurality of cores and a power controller having a first logic to receive a performance scale value indicative of an operating system (OS)-requested performance level, the performance scale value one of a plurality of performance scale values communicated to the OS by the first logic, and to generate a dynamic performance-frequency mapping using the performance scale value, a scalability value and a static performance-frequency mapping, wherein the first logic is to communicate a delivered performance scale value at which the processor is to operate to the OS.

16. The system of claim 15, wherein the first logic is to determine a target operating frequency based at least in part on the performance scale value and one or more processor constraints.

17. The system of claim 16, wherein the first logic is to map the target operating frequency to the delivered performance scale value using the dynamic performance-frequency mapping.

18. The system of claim 15, wherein the first logic is to obtain the plurality of performance scale values from a non-volatile storage having a table to associate each of the plurality of performance scale values with an operating frequency, the table corresponding to the static performance-frequency mapping.

* * * * *